United States Patent Office 3,655,718
Patented Apr. 11, 1972

3,655,718
POLYCARBONATE STABILIZER COMPOSITIONS
Henry G. Schutze and Herschel C. Williams, Baytown, Tex., Norman P. Neureiter, Bethesda, Md., and Delos E. Bown, White Plains, N.Y., assignors to Esso Research and Engineering Company
No Drawing. Division of application Ser. No. 611,785, Nov. 14, 1966, now Patent No. 3,510,507, which is a division of application Ser. No. 248,876, Jan. 2, 1963. Divided and this application Jan. 7, 1970, Ser. No. 1,294
Int. Cl. C07c 69/00, 149/32; C08f 45/58
U.S. Cl. 260—463
3 Claims

ABSTRACT OF THE DISCLOSURE

Polyphosphorous condensation products, polyborate condensation products, polycarbonate condensation products and polysilicate condensation products of 4,4'-bisphenols are especially effective stabilizers for polyolefins.

CROSS REFERENCE TO RELATED APPLICATIONS

This is a division of Ser. No. 611,785, filed Nov. 14, 1966, entitled "Stabilizer Compositions" now U.S. 3,510,507 which in turn is a divisional application of Ser. No. 248,876, filed Jan. 2, 1963, entitled "Stabilizer System," now abandoned and replaced by continuing application Ser. No. 596,720 filed Nov. 4, 1966.

BACKGROUND OF THE INVENTION

(1) Field of the invention

The present invention is directed to new compositions of matter which act as antioxidant stabilizers. More particularly, the invention is concerned with stabilizer systems for polyolefins. In its more specific aspects, the invention is concerned with polyolefin compositions containing antioxidant stabilizers to retard the oxidative degradation of the polyolefins.

DESCRIPTION OF THE PRIOR ART

| U.S. 2,903,493 | U.S. 3,146,254 |
| U.S. 2,976,324 | U.S. 3,146,269 |
| U.S. 3,014,061 | U.S. 3,167,526 |
| U.S. 3,014,944 | U.S. 3,174,946 |
| U.S. 3,092,610 | U.S. 3,190,852 |
| U.S. 3,093,616 | U.S. 3,215,727 |
| U.S. 3,107,233 | U.S. 3,255,136 |
| U.S. 3,112,286 | U.S. 3,297,631 |
| Australian Pat. 248,612 | British Pat. 929,435 |

SUMMARY OF THE INVENTION

The present invention may be briefly described as compositions of matter having the following structural formula:

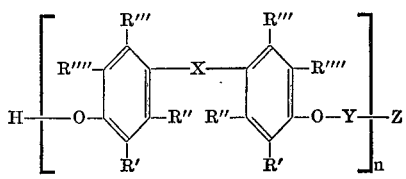

where:
(1) X is selected from the group consisting of:

(a)   —S—

(b) 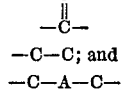

where: R is hydrogen, a $C_1$ to $C_8$ alkyl, an aryl group or combination of these.

(c) 

(d)   —C—C; and (e)   —C—A—C— where: A is a $C_1$ to $C_{16}$ alkylene or an arylene.

(2) R', R'', R''', and R'''' are selected from the group consisting of hydrogen, $C_1$ to $C_{18}$ alkyls, and an aryl group.

(3) Y is selected from the group consisting of:

(a) 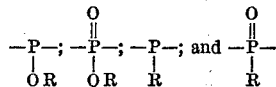

where: R is hydrogen, a $C_1$ to $C_{18}$ alkyl or aryl.

(b)   —B—
    |
   OR where: R is hydrogen, a $C_1$ to $C_{18}$ alkyl or aryl.

(c) 

(d) 

where: $m=0$ to 10, preferably 4 and 8.

(e) 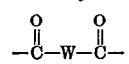

where: W is $(CH_2)_n$—S—$(CH_2)_n$ or
    —$(CH_2)_n$—S—$(CH_2)_m$—S—$(CH_2)_n$— where $n=0$ to 10, preferably 2 and $m=0$ to 10, preferably 5.

(f) 

where: R is an alkyl, preferably —$CH_3$; and (g) 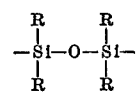

where: R is an alkyl, preferably —$CH_3$; and
(4) Z is

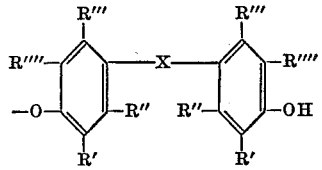

where: R', R'', R''', R'''', and X correspond respectively to the R', R'', R''', R'''', and X previously selected when $n$ has a value from 1 to 15; or Z may be derived from the compound used to introduce Y into the product when $n$ has a value from 2 to 15; for example, —R or —OR where R is hydrogen, an alkyl, or aryl.

In its more specific aspects, the present invention may be described as especially effective stabilizers for polyolefins having the following structural formula:

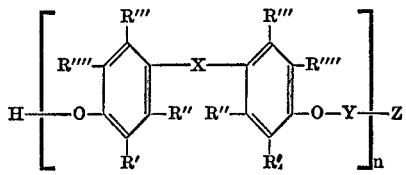

where:
(1) X is selected from the group consisting of:
(a) $-S-$
(b) 
$$-\underset{R}{\overset{R}{C}}-$$

where: R is hydrogen, a $C_1$ to $C_8$ alkyl, an aryl, or combination of these.

(c) 
$$-\underset{}{\overset{O}{\underset{\|}{C}}}-$$

(d) $-C-C-$; and
(e) $-C-A-C-$ where: A is a $C_1$ to $C_{16}$ alkylene or an arylene.

(2) R' is selected from the group consisting of:
$C_4$ to $C_{12}$ tertiary alkyls and $C_3$ to $C_{12}$ secondary alkyls,
R'' is hydrogen,
R''' is hydrogen or a $C_1$ to $C_5$ alkyl,
R'''' is hydrogen or a $C_1$ to $C_2$ alkyl.

(3) Y is selected from the group consisting of:
(a)
$$-\underset{OR}{\overset{O}{\underset{\|}{P}}}-;\; -\underset{OR}{\overset{O}{\underset{\|}{P}}}-;\; -\underset{R}{P}-;\; \text{and}\; -\underset{R}{\overset{O}{\underset{\|}{P}}}-$$

where: R is hydrogen, a $C_1$ to $C_{18}$ alkyl or aryl.

(b)
$$-\underset{OR}{B}-$$

where: R is hydrogen, a $C_1$ to $C_{18}$ alkyl or aryl.

(c)
$$-\overset{O}{\underset{\|}{C}}-$$

(d)
$$-\overset{O}{\underset{\|}{C}}-(CH_2)_m-\overset{O}{\underset{\|}{C}}-$$

where: $m$ equals 0 to 10, preferably 4 and 8.

(e)
$$-\overset{O}{\underset{\|}{C}}-W-\overset{O}{\underset{\|}{C}}-$$

where: W is $-CH_2-CH_2-S-CH_2-CH_2-$ or
$-CH_2-CH_2-S-(CH_2)_5-S-CH_2-CH_2-$ (f)
$$-\underset{R}{\overset{R}{Si}}-$$

where: R is an alkyl, preferably $-CH_3$; and (g)
$$-\underset{R}{\overset{R}{Si}}-O-\underset{R}{\overset{R}{Si}}-$$

where: R is an alkyl, preferably $-CH_3$.

(4) Z is

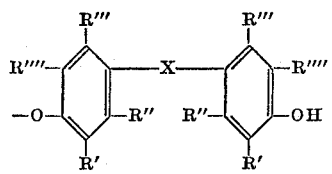

where: R', R'', R''', R'''', and X are the same as previously selected; and
(5) $n$ has a value from 1 to 3.

DESCRIPTION OF PREFERRED EMBODIMENTS

The compositions of matter of the present invention have the advantage over known stabilizers due to their thermal stability. The preparation of the stabilizers according to the present invention produces a mixture of the compositions of matter having varying molecular weights which requires no purification to be effective in retarding the oxidative degradation of organic materials. The compositions of matter of the present invention are quite important and useful in that they are easily prepared and may be handled easily, and accordingly, are commercially attractive.

When the compositions of matter of the present invention are added to polyolefin polymers, they are advantageous over known stabilizers in that the polymers have improved color, increased stability, and superior odor. The additives of the present invention have marked decreased volatility over known stabilizers for polyolefins and are, therefore, advantageous for high temperature applications. The polyolefins containing the stabilizers of the present invention may be used in preparing films, dishes, automobile parts, etc.

In the stabilization of polyolefins, particularly, those polymerized from α-olefins using a Ziegler-type polymerization catalyst, the compositions of matter according to the present invention are especially advantageous since they have excellent solubility and compatability characteristics with the polyolefins, and they are not tied up with metal residues in the polyolefins. The compositions of matter described herein are mostly crystalline white or colorless solids which are easily powdered giving the additional advantage of being able to add the compositions of matter in a dry stabilizer addition system.

The present invention may be further described as a method for preparing the compositions of matter set forth herein. The compositions of matter are obtained as condensation products of the reaction of a bisphenol with a condensing or linking agent under conditions whereby the degree of condensation can be controlled. The condensation products are a mixture of the compositions of matter of the present invention and have molecular weights which depend on the mole ratio of starting materials and the degree to which the reaction is carried to completion by the removal of one of the reaction products.

The phenols which may be used in the condensation reactions are selected from the 4,4'-bisphenols. Illustrative of these phenols are: 4,4' - butylidenebis (3 - methyl-6 - t - butylphenol); 4,4' - thiobis (3 - methyl - 6 - t-butylphenol); 4,4' - methylenebis(3 - methyl - 6 - t - butylphenol); 4,4' - isopropylenebisphenol; 4,4' - isopropylenebis (2 - isopropylphenol); 4,4' - methylenebis (2-methyl - 6 - t - butylphenol). Other 4,4' - bisphenols which may be used are the reaction products of substituted phenols and aldehydes or ketones.

The condensing or linking agents of the present invention are of two types; the ester-type, which are esters of triaryl or mixed aryl-alkyl compounds, and the acid halide type.

The ester-type condensing agents may be selected from the triaryl phosphites, triaryl phosphonites, triaryl phosphates, triaryl phosphonates, triaryl borates and diaryl carbonates wherein the aryl may be phenyls, cresols, xylenols, and combinations of these or the like. The mixed aryl-alkyl condensing agents are the diaryl-alkyl phosphites, diaryl-alkyl phosphonites, diaryl-alkyl phosphates, diaryl-alkyl phosphonates, diaryl-alkyl borates, and the aryl-alkyl carbonates. The preferred condensing agents are triphenyl phosphite, diphenyl 2-ethyl-hexyl phosphite, diphenyl octyl phosphite, diphenyl phosphonate, diphenyl phenyl phosphonite, triphenyl phosphate, diphenyl octyl phosphate, triphenyl borate, and diphenyl carbonate.

The acid halide condensing or linking agents may be illustrated by the diacid chlorides, diacid bromides, and the chloro- or bromosilanes. The chlorides are preferred such as adipyl chloride, sebacyl chloride, the dichloride of thiodipropionic acid, phosgene, and dichlorodimethylsilane.

When the ester-type of condensing or linking agent described hereinabove, is used, the condensation reaction is carried out preferably in the presence of a basic catalyst. Suitable catalysts are the alkali metals, sodium, potassium or lithium, although sodium is preferred; tetra-n-butyl ammonium hydroxide; sodium hydroxide; potassium t-butoxide; sodium methoxide; and similar materials. The basic catalyst is used in effective amounts from about 0.001 to about 0.05 weight percent based on the total reactants employed. When the acid halide type of condensing or linking agent is used, the condensation is carried out in the presence of at least an equivalent amount of a suitable weak base such as pyridine, or alternatively in a high boiling solvent without base, to effect the continuous removal of the hydrogen chloride formed.

According to one embodiment of the present invention wherein an ester-type condensing or linking agent is used, a mixture of the new compositions of matter are obtained under conditions wherein the condensation reaction is driven to completion by the removal of the phenol or phenolic-type reaction product. Accordingly, the conditions for the condensation reaction may vary from temperatures in excess of 182° C. at atmospheric pressures (the boiling point of phenol) to a temperature wherein the phenol or phenolic-type reaction product will be evolved using a vacuum of about 1 to 2 mm. Hg. Since in most instances the removal of the phenol or phenolic-type reaction product is not easily separated from the starting materials, it is preferred to utilize temperatures within the range of about 160 to about 200° C. as well as evacuating the reactor in which the condensation reaction is taking place. Suitable conditions for carrying out the reaction are at about 180° C. and a vacuum of about 25 mm. Hg.

The respective amounts of the bisphenol and the ester-type condensing or linking agent which are reacted have a basis on the resulting molecular weight of the composition of matter formed. Further when using the ester-type condensing agent, the molecular weight of the compositions of matter of the present invention are increased by increasing the amount of phenol or phenolic-type compound removed when the bisphenol and condensing agent are reacted. The bisphenol and the condensing agent may be reacted in a molar ratio from about 3:1 to about 1:1. Preferably the ratio is about 2:1.

When the compositions of matter of the present invention are prepared using an acid halide-type condensing or linking agent, the condensation reaction is carried out preferably at room temperatures. The reaction, however, may be carried out at temperatures within the range of about −10° C. to about 150° C. The bisphenol and acid halide-type condensing agent are reacted in molar ratios from about 3:1 to about 1:1. The preferred ratio is about 5:4.

The compositions of matter of the present invention are useful as stabilizers to retard the oxidative degradation of fats, hydrocarbons, and high molecular weight polyolefins. The stabilizers of the present invention are added to the materials to be stabilized in amounts from about 0.01 to about 1.5 percent by weight. The compositions of matter of the present invention are especially effective in high molecular weight solid polyolefins when there is also added a dialkyl sulfide costabilizer such as exemplified by dilaurylthiodipropionate, "lorol" thiodipropionate, ditridecylthiodipropionate and distearyl thiodipropionate. It has been found that when the compositions of matter of the present invention and sulfide compounds as illustrated are used, that there is a synergistic effect in high molecular weight solid polyolefin. Other alkyl sulfides illustrative of those which may be used are bis(tetradecylmercapto)-p-xylene; bis(octadecylmercapto)-p-xylene; 19,24-dithiotetra-contane; 19,25-dithiohentetracontane; and dicetyl sulfide. The compositions of matter of the present invention when used as stabilizers for high molecular weight polyolefins are used in amounts from about 0.01 to about 1.0 weight percent of the polymer to be stabilized. Preferably the polymers are stabilized using amounts from about 0.05 to about 0.20 percent by weight. The dialkyl sulfides are used in amounts from about 0.05 to about 1.0 percent by weight with a preferred amount from about 0.1 to about 0.5 percent by weight.

The polyolefin polymers stabilized or treated in accordance with the present invention are polymers which are produced by the well known methods. The polymers may be illustrated by those produced by the high pressure, low pressure, or Ziegler-type polymerization process. The polyolefin polymers are exemplified by polymers of $\alpha$-olefins having 2 to 8 carbon atoms in the molecule and may be illustrated by polyethylene, polypropylene, ethylenepropylene copolymers, ethylenebutene-1 copolymers, ethylenepentene-1 copolymers, and the like, having molecular weights in the range from about 10,000 to about 1,000,000. The polymers which are specifically illustrated for treatment in accordance with the present invention were produced by polymerization of the corresponding olefins employing the Ziegler-type polymerization catalyst.

In employing the compositions of matter of the present invention, they may suitably be added to a polyolefin in a solution of an aromatic hydrocarbon. The solution may be sprayed over the pellets or particles of the polyolefin and the resulting mixture then extruded through a suitable extrusion device to form a homogeneous mixture. The compositions of matter may also be added as a dry solid where the compositions of matter so exist. After adding the compositions of matter of the present invention to the polymer particles, the resulting mixture may be milled or extruded or passed through other mixing devices to intimately admix the polymer particles with the solid compositions of matter of the present invention to form a homogeneous mixture. The dialkyl sulfides employed may also be added to the polymer particles in a manner similar to that of the addition of the compositions of matter of the present invention.

The invention will be further illustrated by the following specific examples which are given by way of illustration and not as limitations on the scope of the invention.

The following examples illustrate one mode of producing the new compositions of matter according to the present invention using several different bisphenols and an ester-type condensing or linking agent. Also illustrated are various conditions which affected the molecular weights of the products. Most products were colorless solids. Accordingly, these products are very effective stabilizers for stabilizing sensitive materials to color such as polypropylene. It is noted that the products obtained were not purified in any way, and it is considered that colorless products may be obtained by ordinary purification techniques such as adsorption, freeze drying and the like. It is to be understood that many other bisphenols may be used.

EXAMPLE I 4,4'-butylidenebis(3-methyl-6-t-butylphenol), 76.6 g. (0.2 mole), triphenylphosphite, 62.0 g. (0.2 mole), and 0.05 g. of sodium were placed in a two-necked flask equipped with magnetic stirring, a thermometer, and a cold trap. A vacuum (1–2 mm. Hg) was applied to the exit of the cold trap, and the mixture was then heated while stirring until about two equivalents of phenol had been removed. The total reaction time was 2⅔ hours, and the final reaction temperature was 172° C. The weight of phenol recovered was 32.8 grams, and the weight of product recovered was 103.7 grams. The product was a colorless, crystalline solid, M.P. 91–92° C. and molecular weight of 1990. By describing the solid product as "crystalline," it is not meant that the products have a well-defined crystal structure since the products are more like pulverizable glasses. The term "crystalline" as used herein should not be construed restrictively.

EXAMPLE II

Same as Example I, except used high vacuum (10 microns) to remove last traces of phenol. The total reaction time was 3½ hours, and the final reaction temperature was 200° C. There was recovered 35.3 grams of phenol and 101.6 grams of product, a white crystalline solid, M.P. 93–95° C. and molecular weight of 2960.

EXAMPLE III

Same procedure as Example I, except used 71.6 grams (0.2 mole) of 4,4'-thiobis(3-methyl-6-t-butyl-phenol). The total reaction time was 7 hours, and the final reaction temperature was 190° C. There was recovered 35.2 grams of phenol and 95.1 grams of product, a dark brown crystalline solid, M.P. 75–80° C.

EXAMPLE IV

Same procedure as Example I, except used 110.0 grams (0.2 mole) of dipinene diphenol. The total reaction time was 8½ hours, and the final reaction temperature was 200° C. There was recovered 31.2 grams of phenol and 139.6 grams of product, a yellow crystalline solid, M.P. 97–105° C.

EXAMPLE V

Same procedure as Example I, except used 68.0 grams (0.2 mole) of 4,4' - methylenebis - (2-t-butyl-6-methyl-phenol). The reaction time was 9 hours, and the final reaction temperature was 209° C. There was recovered 27.2 grams of phenol and 102.8 grams of product, a colorless crystalline solid.

EXAMPLE VI

Same procedure as Example I, except used 68.0 grams (0.2 mole) of 4,4' - methylenebis - (3-methyl-6-t-butyl-phenol). The reaction time was 3 hours, and the final reaction temperature was 210° C. There was recovered 34.1 grams of phenol and 95.1 grams of product, a colorless, crystalline solid, M.P. 85–90° C.

EXAMPLE VII

Same procedure as Example I, except used 45.6 grams (0.2 mole) of 4,4'-isopropylidenebisphenol. The total reaction time was 4 hours, and the final reaction temperature was 202° C. There was recovered 35.2 grams of phenol and 72.2 grams of product, a crystalline solid.

EXAMPLE VIII

The same procedure was used as in Example I, except the phenol used was 115.1 g. (0.2 mole) of 4,4'-bisphenol obtained from the reaction of 3 moles of 3-methyl-6-t-butylphenol and 1 mole of 2-butenal. The reaction time was 6 hours, and the reaction temperature was 198° C. There was recovered 29.5 g. of phenol and 132.9 g. of a light brown crystalline solid.

The following examples are illustrative of several basic catalysts which may be used when a bisphenol and an ester-type condensing agent are reacted to produce the compositions of matter of the present invention. The examples include variations in the conditions to illustrate their effect on molecular weight.

EXAMPLE I–A

Same as Example I, except that 0.05 g. of tetra-n-butyl ammonium hydroxide was used instead of sodium. The total reaction time was 2½ hours, and the final reaction temperature was 200° C. The weight of phenol recovered was 24.5 grams, and the weight of product recovered was 103.9 grams. The product was a colorless, crystalline solid.

EXAMPLE II–A

Same as Example I, except that 0.20 g. of sodium hydroxide was used instead of sodium. The total reaction time was 3 hours, and the final reaction temperature was 195° C. There was recovered 29.4 grams of phenol and 108.0 grams of product, a white crystalline solid, molecular weight of 795.

EXAMPLE III–A

Same as Example I, except that 0.1 g. sodium methoxide was used instead of sodium. The total reaction time was 3 hours, and the final reaction temperature was 200° C. There was recovered 27.9 grams of phenol and 108.0 grams of product, a white crystalline solid.

EXAMPLE VI–A

Same as Example I, except that 0.20 g. of potassium t-butoxide was used instead of sodium. The total reaction time was 4½ hours, and the final reaction temperature was 205° C. There was recovered 32.9 grams of phenol and 103.9 grams of product, a white crystalline solid, molecular weight of 2588.

EXAMPLE V–A

Same as Example I, except that 0.10 g. of potassium t-butoxide was used instead of sodium. The total reaction time was 6 hours, and the final reaction temperature was 216° C. There was recovered 32.8 grams of phenol and 104.5 grams of product, a white crystalline solid, molecular weight of 1912.

Several ester-type condensing agents are illustrated in the following examples. The preferred condensing or linking agents are the aryl or, more specifically, the phenyl compounds. The relative ease of removing the resulting phenol when using the phenyl compounds enables the conditions to be selected such that the products of the condensation reaction are the compositions of matters of the present invention having the molecular weights wished to be obtained. Other condensing agents may be used, however, as set forth hereinbefore.

EXAMPLE I–B 4,4'-butylidenebis(3-methyl - 6 - t-butylphenol), 76.6 g. (0.2 mole), triphenylphosphate, 65.2 g. (0.2 mole), and 0.05 g. of sodium were placed in a 500 ml. round bottom flask equipped with magnetic stirring, a thermometer, and a cold trap. The mixture was heated under 5–10 mm. vacuum, and the temperature gradually raised to 180° C. over a period of 2 hours. Upon cooling to room temperature, there was obtained 30.3 g. of phenol in the cold trap and 109.0 g. of product, a colorless crystalline solid, M.P. 93–95° C., molecular weight of 2182.

EXAMPLE II–B

The same as Example I–B, except that 0.20 g. of potassium t-butoxide was used instead of sodium. The total reaction time was 3½ hours, and the final reaction temperature was 188° C. There was recovered 33.5 of phenol and 106.9 g. of a colorless crystalline solid.

EXAMPLE III–A

Same procedure as Example I–B, except used 45.6 g. (0.2 mole) of 4,4'-isopropylidenebisphenol. The total reaction time was 3 hours, and the final reaction temperature was 145° C. There was recovered 41.7 grams of phenol and 98.1 grams of product, a crystalline solid.

EXAMPLE IV–B 4,4' - butylidenebis(3 - methyl-6-t-butylphenol), 76.6 g. (0.2 mole), triphenylborate, 58.0 g. (0.2 mole) and 0.1 g. of potassium t-butoxide were placed in a 500 ml. round bottom flask equipped with magnetic stirring, a thermometer, and a cold trap. The mixture was heated under 5–10 mm. vacuum, and the temperature gradually raised to 200° C. over a period of 6 hours. Upon cooling to room temperature, there was obtained 33.8 g. of phenol in the cold trap and 83.0 g. of product, a colorless crystalline solid.

EXAMPLE V–B 4,4' - butylidenebis(3 - methyl-6-t-butylphenol), 76.6 g. (0.2 mole), diphenylcarbonate, 42.8 g. (0.2 mole) and 0.1 g. of potassium t-butoxide were placed in a 500 ml. round bottom flask equipped with magnetic stirring, a thermometer, and a cold trap. The mixture was heated under 5–10 mm. vacuum, and the temperature gradually raised to 201° C. over a period of 2 hours. Upon cooling to room temperature, there was obtained 33.8 g. of phenol in the cold trap and 83.0 g. of product, a colorless crystalline solid, M.P. 142–150° C., molecular weight of 1764.

EXAMPLE VI–B

Same procedure as Example V–B, except 21.4 g. (0.1 mole) of diphenyl carbonate was used. The reaction time was 3 hours, and the final reaction temperature was 189° C. There was recovered 17.4 grams of phenol and 80.6 grams of product, a crystalline solid, M.P. 106–108° C., molecular weight of 775.

The compositions of matter of the present invention may also be obtained by using the acid halide-type condensing or linking agents. When using the acid halide-type condensing or linking agent, it is not necessary to use a basic catalyst. However, a weak base such as pyridine, ammonia, or the like, is used to neutralize the resulting hydrogen halide. The examples which follow will illustrate the methods of preparation using the acid halide-type condensing or linking agents.

EXAMPLE I–C 4,4' - butylidenebis(3 - methyl-6-t-butylphenol) 76.6 g. (0.2 mole) was dissolved in 250 ml. of anhydrous ether and placed in a three-neck flask equipped with a magnetic stirrer, a thermometer, a condenser, a gas inlet tube, and a nitrogen blanket. Then 25.3 g. (0.32 mole) of anhydrous pyridine was added, followed by the slow addition of 16.0 g. (0.16 mole) of phosgene. The reaction temperature was 35–40° C. and the reaction time was 4 hours. The reaction mixture was then flushed with nitrogen, and the pyridine hydrochloride removed by filtration. The filtrate was washed with water until neutral, dried over alumina, and the ether removed on a rotating evaporator. There was recovered, 66.8 g. of a white crystalline solid, M.P. 128–135° C. molecular weight of 1038.

EXAMPLE II–C

Same procedure as Example I–C, except used 9.9 g. (0.1 mole) of phosgene and 15.8 g. (0.2 mole) of pyridine in 700 ml. of benzene as solvent. There was recovered 78.2 g. of a white crystalline solid, M.P. 179–181° C., molecular weight of 676.

EXAMPLE III–C 4,4' - butylidenebis(3 - methyl-6-t-butylphenol), 57.5 g. (0.15 mole), was added to a mixture of 2.3 g. (0.1 mole) of sodium sand in toluene. To this was added slowly 5.0 g. (0.05 mole) of phosgene. The mixture was cooled to room temperature, and the product recovered as in Example IC. A light brown solid, 48.5 g., was recovered having a M.P. of 176–182° C.

Example III–C illustrates the use of sodium to produce the sodium salt of the bisphenol which may be further reacted with the linking agent, phosgene, to produce a composition of matter according to the present invention.

EXAMPLE IV–C 4,4'-butylidenebis(3-methyl - 6 - t - butylphenol), 20 g. (0.05 mole) was dissolved in 250 ml. of toluene, and the toluene heated for complete dissolution. The mixture was refluxed and adipyl chloride, 7.5 g. (0.041 mole), was added over a period of about one-half hour and refluxed for another one and one-half hours. Then pyridine, 6.5 g. (0.082 mole), was added, and stirring and refluxing was continued for about one and one-half hours. The resulting pyridine hydrochloride precipitate was removed by filtration. The filtrate was washed with water, HCl, and again with water and then dried over sodium sulfate. The solvent was removed on a Rinco rotating evaporator, and there was obtained a slightly brownish solid, 24.7 g., which was pulverized to a fine powder.

EXAMPLE V–C

The same procedure as Example IV–C except instead of adipyl chloride the product from the reaction of thiodipropionic acid and thionyl chloride was used. There was recovered a slightly off-white crystalline solid product.

EXAMPLE VI–C

Same procedure as Example IV–C except used sebacyl chloride. The total reaction time was about 5 hours, and there was recovered a light tan solid.

The following examples illustrate various modifications which may be used in the preparation of compositions of matter according to the present invention.

EXAMPLE I–D 4,4' - butylidenebis(2 - t - butyl - 5 - methylphenol), 25.0 g. (0.065 mole) in 150 ml. of benzene. Adipyl chloride 7.15 g. (0.039 mole) was added over a period of about two hours while refluxing the bisphenol and benzene. Refluxing was continued for 40 hours. The solution was cooled and neutralized by adding ammonia. The solution was washed several times with water and dried over sodium sulfate, and the benzene removed under vacuo with a Rinco rotating evaporator. The resulting product was a white crystalline solid having a molecular weight of 1100.

EXAMPLE II–D

Same procedure as Example I–D except used 3:1 mole ratio of reactants instead of 5:3. The resulting product was a fine free-flowing powder.

EXAMPLE III–D

Same procedure as Example I–D except used sebacyl chloride instead of adipyl chloride. There was recovered a fine white product having a molecular weight of about 1400.

EXAMPLE IV–D

The same procedure as Example I–D except the condensing agent was the reaction product of thiodibutyric acid and thionyl chloride. There was recovered a light tan solid.

The following examples are given to illustrate the various phenols which may be used as starting materials in the condensation with an ester-type condensing or linking agent.

EXAMPLE I–E

Same as Example V–A, except used 4,4' - dihydroxy-3,3' - di-t-butyl - 6,6' - dimethyl-benzophenone instead of 4,4'-butylidenebis(3-methyl-6-t-butylphenol).

EXAMPLE II–E

Same as Example V–A, except used 1,2-bis(3-t-butyl-6 - methyl - 4 - hydroxyphenyl) ethane instead of 4,4'-butylidenebis(3-methyl-6-t-butylphenol).

EXAMPLE III–E

Same as Example V–A, except used $\alpha^2,\alpha^6$-bis(3-t-butyl-6 - methyl - 4 - hydroxyphenyl) 1,4 - dimethylbenzene instead of 4,4' - butylidenebis(3 - methyl-6-t-butylphenol).

The ester-type condensing or linking agent may be selected from a large group of specific compounds as illustrated by the examples which follow.

EXAMPLE I–F

Same as Example V–A, except used diphenyloctylphosphite instead of triphenylphosphite.

EXAMPLE II–F

Same as Example V–A, except used diphenyl - 2 - ethylhexylphosphite instead of triphenylphosphite.

EXAMPLE III-F

Same as Example V-A, except used diphenyl - 2 - ethylhexylphosphate instead of triphenylphosphite.

EXAMPLE IV-F

Same as Example V-A, except used diphenylphenylphonite instead of triphenylphosphite.

EXAMPLE V-F

Same as Example V-A, except used diphenylphenylphosphonite instead of triphenylphosphite.

EXAMPLE VI-F

Same as Example V-A, except used diphenyl - 2 - ethylhexylphosphonate instead of triphenylphosphite.

EXAMPLE VII-F

Same as Example V-A, except used diphenylphosphonate instead of triphenylphosphite.

EXAMPLE VIII-F

Same as Example V-A, except used diphenylphosphonate instead of triphenylphosphite.

The following example illustrates the preparation of a composition of matter according to the present invention wherein a silane is used as the condensing or linking agent.

EXAMPLE I-G 4,4' - butylidenebis(3 - methyl - 6 - t - butylphenol), 26.0 g. (0.068 mole), was dissolved in 180 ml. of carbon tetrachloride. The mixture was heated to reflux and then dichlorodimethylsilane, 7.0 g. (0.054 mole), was added dropwise. The mixture was refluxed for five days. The mixture was cooled to room temperature, filtered, and the filtrate washed with water and dried. The solution was concentrated by using a Rinco rotating evaporator. There was recovered 18.9 g. of a very light pink solid.

The foregoing examples illustrate the various methods and conditions for preparing the compositions of matter of the present invention. However, it is to be noted that each method must be characterized as producing a "mixture" of the compositions of the present invention. The term "mixture" is used herein to mean that the products of the foregoing examples will contain compositions of matter of the present invention which differ only by a difference in the number of repetitive groups and thus in a marked degree in molecular weight. The methods of preparation set forth also produce a "mixture" wherein one composition of matter differs from others in the "mixture" by the terminal group. These "mixtures" produced appear to follow a probability distribution, and as shown in the examples, are subject to change depending on the conditions; e.g. using an excess of phenol or condensing agent. The distribution in the "mixtures" is reproducible. The individual compositions of matter may be separated from the "mixtures" by known methods. The compositions of matter are effective stabilizers when used, however, as a "mixture." The average molecular weight of the products produced by the methods of preparation are between about 600 and 8000 or higher. The preferred average molecular weight of the compositions of matter of the present invention as stabilizers is between about 800 and 2000.

The mixture produced in Example VI-B was fractionated to isolate the compositions of matter of the present invention per se. Using a liquid chromatographic technique with rubber as the stationary phase, a sample was passed through a 100 cm. x 15 mm. column. The elution curve obtained clearly demonstrated that the sample contained four or five molecular weight species of which three were compositions of the present invention having the following structure:

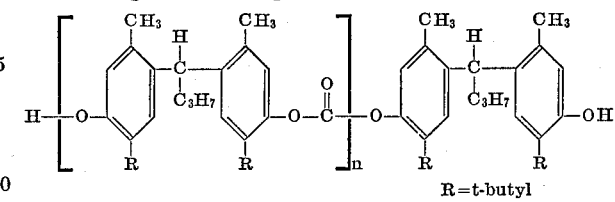

R=t-butyl where $n=1$, 2, and 3. The higher molecular weight compositions of matter were not specifically isolated since they tended to come off the column together as single fraction. The fractionation revealed that the composition of matter of $n=1$ is predominant in the mixture of Example VI-B as was expected. This example produces a composition of matter of $n=1$ and illustrates that while a single composition of matter may be predominant, a "mixture" is produced. The other compositions of matter of the present invention may be resolved from the "mixtures" using the liquid chromatographic technique. Thus, the phosphites, phosphates, phosphonates, borates, carbonates, and silanes, for example, are obtained as compositions of matter from the corresponding "mixture." A mild hydrolysis of the products of the examples heretofore described may be used before the mixtures are to be fractionated so that the terminal groups are predominantly hydroxy groups. By this technique the mixtures may be resolved to the individual compositions of matter of the present invention, but it is emphasized that the "mixtures" are suitable as such as stabilizers for hydrocarbons, high molecular weight polymers, gasoline, fats and the like.

To illustrate the stabilizing efficiency of the compositions of matter of the present invention, they were incorporated into each of three high molecular weight polyolefins, polypropylene, poly-4-methyl-1-pentene, and ethylenebutene-1 copolymer. The samples of stabilized polymer using the mixture of composition of matter of the present invention were obtained as pellets. The pellets were inserted into a sample holder consisting of a Pyrex glass U-tube of 8 mm. diameter with each leg being about 8 inches long. Each leg of the U-tube was filled with polymer pellets to a height of about 3½ to 4 inches (total amount approximately 4 grams). The filled U-tubes were then placed in an oil bath at 150° C. Air was passed through the U-tube and the bed of pellets at a rate of about 10 cc./min. The induction period, or the number of days before the onset of rapid degradation, was recorded as the oxidative stability of the sample. In general, the samples maintained their original color and molecular weight throughout the induction period, after which time the samples completely degraded in a period of less than one day. This test of the stabilizer is an accelerated aging test which allows the comparison of any of the various stabilizer systems to determine the suitability of stabilizers for any of the high molecular weight polyolefins.

The stability data for the compositions of matter of the present invention incorporated in polypropylene are summarized in Tables I and II. The results of this accelerated aging test to be commercially acceptable for stabilizing polypropylene should give an induction period of about 30 to 40 days. The data of Table I illustrate the effectiveness of the compositions of matter of the present invention when used with a secondary stabilizer or co-stabilizer, the combination giving a synergistic effect. The co-stabilizer used in the test was dilaurylthiodipropionate (DLTDP).

The data of Table II illustrate the effectiveness of the compositions of matter of the present invention when used as a single stabilizer in polypropylene. Here the testing was done at 100° C. and 120° C.

As a further illustration of the compositions of matter of the present invention they were incorporated into poly-4-methyl-1-pentene and tested as described above, except the testing conditions were 160° C. with oxygen instead of 150° C. with air. The data are summarized in Table III. Shown for comparison are data obtained with the most effective commercially available stabilizer systems for this polymer.

As an additional illustration, the compositions of the present invention were incorporated into an ethylene-butene-1 copolymer, and samples were tested in an air circulating oven at 115° C. The samples tested were 75 mil, 4 inch square compression molded pads. The samples were allowed to remain in the oven until degradation occurred as evidenced by cracking or crazing. The data are summarized in Table IV. Again, for comparison, commercially available samples of stabilized ethylene-butene-1 copolymer were tested.

TABLE I.—COLOR AND OXIDATIVE STABILITY OF STABILIZED POLYPROPYLENE

| Sample No. | Stabilizer system | Weight percent | Color of stabilized polymer | Oxidative stability, days |
|---|---|---|---|---|
| 30 | Dilaurylthiodipropionate (DLTDP). | .3 | 1+ | 1 |
| 410 | 4,4'-butylidenebis(3-methyl-6-t-butylphenol). | .1 | 3+ | 1 |
| 494 | DLTDP, 4,4'-butylidenebis-(3-methyl-6-t-butylphenol). | .3,.1 | 3+ | 18 |
| 157 | DLTDP, Example I | .3,.1 | 2+ | 71 |
| 158 | DLTDP, Example I, zinc 2-ethylhexanoate. | .3,.1,.03 | 1 | 67 |
| 165 | DLTDP, Example I, zinc stearate. | .3,.1,.03 | 1 | 72 |
| 164 | DLTDP, Example I, zinc 2-ethylhexanoate. | .7,.175,.03 | 1 | 126 |
| 161 | do | 15,.1,.03 | 1 | 82 |
| 160 | do | .25,.05,.02 | 1 | 47 |
| 949 | DLTDP, Example II | .3,.1 | | 75 |
| 970 | DLTDO, Example III | .3,.1 | | 60 |
| 971 | DLTDP, Example IV | .3,.1 | | 66 |
| 972 | DLTDP, Example V | .3,.1 | | 68 |
| 973 | DLTDP, Example VI | .3,.1 | | 52 |
| 1089 | DLTDP, Example VIII | .3,.1 | | 64 |
| 999 | DLTDP, Example I-A | .3,.1 | | 35 |
| 1003 | DLTDP, Example II-A | .3,.1 | | 43 |
| 1005 | DLTDP, Example III-A | .3,.1 | | 47 |
| 1004 | DLTDP, Example IV-A | .3,.1 | | 57 |
| 1012 | DLTDP, Example V-A | .3,.1 | | 50 |
| 947 | DLTDP, Example I-B | .3,.1 | | 30 |
| 1020 | DLTDP, Example II-B | .3,.1 | | 47 |
| 1072 | DLTDP, Example IV-B | .3,.1 | | 24 |
| 1157 | DLTDP, Example V-B | .3,.1 | | 66 |
| 479 | DLTDP, Example V-B | .3,.1 | 1 | 108 |
| 1158 | DLTDP, Example VI-B | .3,.1 | | 100 |
| 480 | DLTDP, Example VI-B | .3,.1 | 1+ | 139 |
| 1036 | DLTDP, Example I-C | .3,.1 | | 77 |
| 436 | DLTDP, Example I-C, zinc stearate. | .3,.1,.03 | 1 | 80 |
| 1145 | DLTDP, Example II-C | .3,.1 | | 91 |
| 455 | DLTDP, Example II-C, zinc stearate. | .3,.1,.03 | 1 | 110 |
| 1148 | DLTDP, Example III-C | .3,.1 | | 70 |
| 1041 | DLTDP, Example IV-C | .3,.1 | | 83 |
| 1046 | DLTDP, Example V-C | .3,.1 | | 80 |
| 1007 | DLTDP, Example VI-C | .3,.1 | | 84 |
| 418 | DLTDP, Example I-D, zinc stearate. | .3,.1,.03 | 1+ | 100 |
| 1152 | DLTDP, Example II-D | .3,.1 | | 87 |
| 468 | DLTDP, Example II-D | .3,.1,.03 | 1 | 100 |
| 1131 | DLTDP, Example III-D | .3,.1 | | 74 |
| 1108 | DLTDP, Example I-E | .3,.1 | | 30 |

TABLE II.—OXIDATIVE STABILITY OF STABILIZED POLYPROPYLENE

| Sample No. | Stabilizer system | Weight percent | Oxidative stability, days 100° C. | 120° C. |
|---|---|---|---|---|
| 512 | 4,4'-butylidenebis(3-methyl-6-t-butylphenol). | .05 | 103 | 42 |
| 509 | Example I | .05 | 1 (142) | 1 (90) |
| 688 | Example IV-A | .05 | | 1 (90) |

1 Still on test.

TABLE III.—OXIDATIVE STABILITY OF STABILIZED POLY-4-METHYL-1-PENTENE

| Sample No. | Stabilizer system | Weight percent | Oxidative stability, hours |
|---|---|---|---|
| 1221 | DLTDP, commercial stabilizer No. 1 | .5,.2 | 34 |
| 1225 | DLTDP, commercial stabilizer No. 2 | .5,.2 | 34 |
| 1220 | DLTDP, commercial stabilizer No. 3 | .5,.2 | 36 |
| 1188 | DLTDP, Example I | .5,.2 | 114 |
| 1222 | DLTDP, Example IV-A | .5,.2 | 168 |

TABLE IV.—OXIDATIVE STABILITY OF STABILIZED ETHYLENE-BUTENE-1 COPOLYMER

| Sample No. | Stabilizer system | Weight percent | Oxidative stability, days |
|---|---|---|---|
| E-59 | DLTDP, commercial stabilizer No. 1 | .25,.03 | 112 |
| E-72 | DLTDP, Example I | .25,.03 | 1 (168) |
| E-73 | DLTDP, Example V-B | .25,.03 | 1 (168) |

1 Still on test.

From the data of Table I, a comparison of the color and oxidative stability of the individual component of the stabilizer system may be made with the compositions of matter of the present invention. It is apparent that the compositions of matter of the present invention give improved color and oxidative stability to polypropylene. Thus, for example, the mixture of the bisphenol reactant of Example I together with dilaurylthiodipropionate stabilized the polymer for only 18 days. (Sample No. 494.) Whereas the product of Example I together with DLTDP stabilized the polymer for 71 days. (Sample No. 157.) Furthermore, the color of the stabilized polymer using the composition of matter of Example I was improved. With regard to the color, it is seen from the data that the use of a zinc salt such as zinc 2-ethylhexanoate or zinc stearate further improves the color of the stabilized polymer. Utilizing the compositions of matter of the present invention, the concentration of the stabilizer may be held to a minimum to obtain commercially acceptable products. It may be noted that the color of the stabilized polymer would be considerably worse if the concentration of the bisphenol and DLTDP (Sample No. 494) were increased so as to obtain the 30-40 days oxidative stability required for commercial acceptance.

It is further apparent from the data that the carbonate compositions of matter of the present invention have a better color. For example, comparing Sample No. 479 and 480 with Sample No. 157, it is seen that the color of the carbonate stabilized polymer is 1 as compared with the phosphite stabilized polymer having a color of 2. However, as set forth hereinbefore with regard to color, a zinc salt of a carboxylic acid may be used to improve the color of stabilized polymer. Illustrative of the zinc salts are zinc 2-ethylhexanoate, zinc stearate, and zinc formate.

The accelerated aging test as described and the results thereof which are set forth in Table I show the stabilizing efficiency of the compositions of matter of the present invention at elevated temperatures. Thus, the stabilized polymers are suitable for use in applications where elevated temperatures may occur. However, the compositions of matter of the present invention are also suitable for applications at moderate temperatures as illustrated by the data of Table II. In these applications, it is not essential that a dialkyl sulfide or other co-stabilizer be used. Thus, for example, in high molecular weight polypropylene tested using the accelerated aging test described above but at 100° C. and 120° C. instead of 150° C. the composition of matter of Example I stabilized polypropylene for 142 days (Sample No. 509, still on test), whereas the bisphenol reactant of Example I at the same concentration (0.05 weight perceint) failed in 103 days (Sample No. 512.)

From the data of Table III, it is also apparent that the compositions of matter of the present invention are also effective stabilizers for high molecular weight poly 4-methyl-1-pentene. It was found that the compositions of matter of the present invention give a three-fold increase in the life of the polymer, when compared with the most effective stabilizers currently available.

From the data of Table IV, it is apparent that the compositions of matter of the present invention are also superior as stabilizers for the ethylene-butene-1 copolymer.

The nature and objects of the present invention having been completely described and illustrated, what we wish to claim as new and useful and secure by Letters Patent is:

1. A composition of matter having the following structural formula:

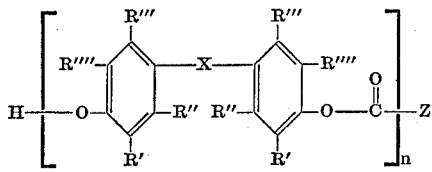

where:
(1) X is selected from the group consisting of:
(a) —S—
(b) 
$$-\overset{\overset{O}{\|}}{C}-$$

(2) R' is selected from the group consisting of:
C$_4$ to C$_{12}$ tertiary alkyls and C$_3$ to C$_{12}$ secondary alkyls,
R'' is hydrogen,
R''' is selected from the group consisting of hydrogen and C$_1$ to a C$_5$ alkyl,
R'''' is selected from the groups consisting of hydrogen and a C$_1$ to C$_2$ alkyl, (3) Z is

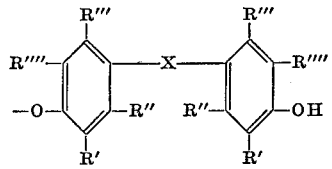

where: R', R'', R''' and R'''' are the same as previously set forth.
(4) $n$ has a value of 1 to 3.

2. A composition of matter having the following structural formula:

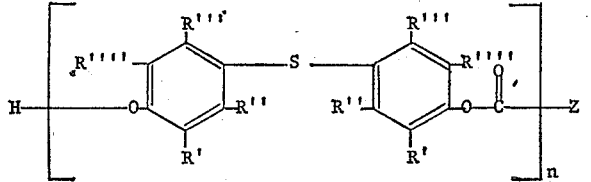

where:
(1) R' is selected from the group consisting of:
C$_4$ to C$_{12}$ tertiary alkyls and C$_3$ to C$_{12}$ secondary alkyls.
R'' is hydrogen.
R''' is selected from the group consisting of hydrogen and C$_1$ to a C$_5$ alkyl.
R'''' is selected from the groups consisting of hydrogen and a C$_1$ to C$_2$ alkyl.

(2) Z is

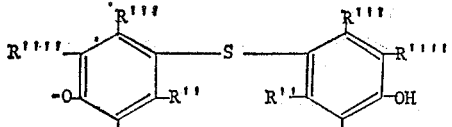

where: R', R'', R''' and R'''' are the same as previously set forth.
(3) $n$ has a value of 1 to 3.

3. A composition of matter having the following structural formula:

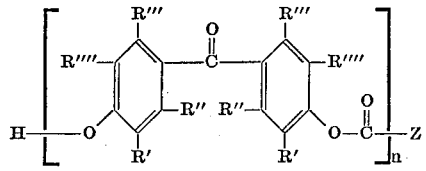

where:
(1) R' is selected from the group consisting of:
C$_4$ to C$_{12}$ tertiary alkyls and C$_3$ to C$_{12}$ secondary alkyls.
R'' is hydrogen.
R''' is selected from the group consisting of hydrogen and a C$_1$ to C$_5$ alkyl.
R'''' is selected from the groups consisting of hydrogen and a C$_1$ to C$_2$ alkyl.

(2) Z is

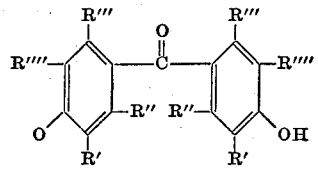

where R', R'', R''', and R'''' are the same as previously set forth; and
(3) $n$ has a value from 1 to 3.

References Cited
FOREIGN PATENTS
887,543   1/1962   Great Britain.

LEWIS GOTTS, Primary Examiner
D. G. RIVERS, Assistant Examiner

U.S. Cl. X.R.
260—45.85, 45.95, 398.5, 448.8 R, 479 R, 479 S, 666.5, 929, 930, 949